(12) United States Patent
Svedberg (10) Patent No.: US 6,972,156 B2
(45) Date of Patent: *Dec. 6, 2005

(54) BODY FORMED OF SET, INITIALLY PASTY MATERIAL AND INCLUDING AN ELECTRICALLY CONDUCTING PATH AND A METHOD OF MAKING SUCH A BODY

(75) Inventor: Björn Svedberg, Stockholm (SE)

(73) Assignee: Readymix Technologies Limited, Dublin (IE)

( * ) Notice: Subject to any disclaimer, the term of this patent is extended or adjusted under 35 U.S.C. 154(b) by 242 days.

This patent is subject to a terminal disclaimer.

(21) Appl. No.: 10/149,241

(22) PCT Filed: Dec. 21, 2000

(86) PCT No.: PCT/SE00/02632

§ 371 (c)(1),
(2), (4) Date: Jun. 10, 2002

(87) PCT Pub. No.: WO01/47674

PCT Pub. Date: Jul. 5, 2001

(65) Prior Publication Data

US 2002/0182395 A1    Dec. 5, 2002

(30) Foreign Application Priority Data

Dec. 23, 1999 (SE) .................................. 99047706

(51) Int. Cl.[7] .............................. B22F 3/00; H01F 1/00; D04H 1/20; H05B 6/00

(52) U.S. Cl. ...................... 428/547; 428/611; 428/114; 428/208; 428/692; 264/108; 264/112; 264/426

(58) Field of Search ................................ 428/547, 551, 428/557, 611, 114, 170, 201, 208, 293.7, 428/472, 692, 539.5, 900, 294.4; 427/128, 427/130; 264/31, 70, 71, 108, 112, 426, 439, 264/443; 29/603.08, 603; 338/21, 309, 321.3; 343/787, 788

(56) References Cited

U.S. PATENT DOCUMENTS 4,062,913 A    12/1977 Miller et al.

(Continued)

FOREIGN PATENT DOCUMENTS

| AU | WO 97/46774 | * 12/1997 |
| EP | 0 499 439 | 8/1992 |

*Primary Examiner*—Stevan A. Resan
*Assistant Examiner*—Louis Falasco
(74) *Attorney, Agent, or Firm*—William E. Jackson; Stites & Harbison, PLLC (57) ABSTRACT

A body (5) of set, initially pasty material, such as concrete, includes an electrically conducting path formed by a concentrated layer (6) of electrically conducting magnetizable elements, such as fibers (F) or granules (G), embedded in the initially pasty material and extending through at least a portion of the body (5). Electrically conducting terminal members (9) may be connected to the electrically conducting layer (6) at spaced-apart positions along the layer (6). A method of providing such a body (5) includes the steps of: (a) forming a body of the pasty material in which electrically conducting magnetizable elements (F) are dispersed, (b) applying a magnetic field to the body of pasty material to form from the magnetizable elements an electrically conducting layer embedded in the body of pasty material and extending at least through a portion the body (5), and (c) causing the body of pasty material containing the layer (6) to set. Before or after the setting of the body (5) of pasty material, electrically conducting terminal members (9), may be connected to the electrically conducting layer (6) at spaced-apart positions along the layer.

20 Claims, 7 Drawing Sheets

U.S. PATENT DOCUMENTS

| | | | |
|---|---|---|---|
| 4,458,294 A * | 7/1984 | Womack | 338/309 |
| 4,604,676 A * | 8/1986 | Senda et al. | 361/309 |
| 5,346,547 A * | 9/1994 | McCormack | 428/929 |
| 5,522,962 A * | 6/1996 | Koskenmaki et al. | 427/130 |
| 5,628,955 A * | 5/1997 | Houk | 264/108 |
| 5,742,223 A * | 4/1998 | Simendinger et al. | 338/21 |
| 5,906,042 A * | 5/1999 | Lan et al. | 29/852 |
| 6,740,282 B1 * | 5/2004 | Svedberg | 264/439 |

\* cited by examiner

BODY FORMED OF SET, INITIALLY PASTY MATERIAL AND INCLUDING AN ELECTRICALLY CONDUCTING PATH AND A METHOD OF MAKING SUCH A BODY

This invention relates to a body formed of a set, initially pasty material and including an electrically conducting path. Moreover, the invention relates to a method of making such a body.

It is known to reinforce bodies of concrete or other cementitious and initially pasty, viscous material by including steel or carbon fibres in the concrete or other pasty material before it is allowed to set. In the case of concrete and where the fibres are of steel, they typically have a length of 2.5 to 8 cm or longer and a diameter in the range of 0.5 to 1 mm and thus are relatively rigid. During the mixing of the fibres and the concrete, the fibres are dispersed in the concrete and orientated randomly in three dimensions so that the cast and hardened concrete body will be reinforced in three dimensions.

Many, or even most, concrete structures are only stressed in one or two dimensions, however, so that reinforcement in one or two dimensions would be adequate. This is so in the case of concrete floor slabs and concrete road pavements, to mention only two examples.

According to a known method for one-dimensional alignment of steel fibres in slabs of wet concrete newly cast in a form, a magnetic field is directed through the newly cast, wet concrete body in the casting form and displaced relative to the form from one end or side thereof to the other in order to apply a temporary aligning force to the individual fibres for aligning them in the direction of relative movement (U.S. Pat. No. 4,062,913). To facilitate the aligning movement of the fibres under the action of the magnetic field, the concrete body is vibrated during the relative movement of the magnetic field and the concrete body.

It has been proposed to use electrically conducting fibres in concrete to pass an electric current through the concrete for heating or other purposes, e.g. to provide electrical earthing or electromagnetic shielding (U.S. Pat. Nos. 5,346,547, 5,447,564, EP-A-0449439.

However, conducting fibres which are randomly orientated or one-dimensionally aligned by the known technique are not suitable for such purposes, because they do not provide a suitable electrically conducting path through the concrete and because it is difficult to obtain a satisfactory connection of electrical terminal members to the fibres. The concrete itself is a poor conductor and the fibres are substantially evenly distributed throughout the concrete so that only few fibres contact each other. For that reason, the fibres do not provide a coherent and wide current path between the terminal members.

An object of the invention is to provide an improved body of the kind indicated above. A further object is to provide a method of making such a body.

In accordance with the present invention there is provided body formed of a set, initially pasty material and including an electrically conducting path formed by a concentrated layer of electrically conducting magnetizable fibrous and/or granular elements, said layer being embedded in said material and extending through at least a portion of said body.

Because the initially more or less randomly distributed magnetizable fibrous and/or granular elements in the pasty material, which may be concrete, for example, are ultimately stratified to form a layer in which they are substantially more densely arranged than initially, a sufficiently large number of fibres or granular elements are sufficiently close or contact one another throughout the extent of the layer to provide between the terminal members a conducting path of adequate current carrying or shielding capability. Preferably, the layer is positioned such that that it extends generally parallel to a face of the body, which may be, for example a slab or some other plate-like body. If the body is to be used in an application in which it is desirable to pass an electric current through the electrically conducting path formed of or including the layer, e.g. to heat the body, the body preferably includes electrically conducting terminal members connected to the electrically conducting layer at spaced-apart positions along the layer.

If the layer of magnetizable elements is made up of or includes reinforcing fibres of metal, it suitably is positioned in the body where the demand for reinforcement is the greatest. The thinning out of the fibre reinforcement in other parts of the body resulting from the concentration of the fibres to a single or a few layers therefore need not entail any serious loss of the strength of the body.

In accordance with the invention there is also provided a method of providing an electrically conducting path in a body formed of a set, initially pasty material, the method including the steps of forming a body of the pasty material in which electrically conducting magnetizable fibrous or granular elements are dispersed, applying a magnetic field to the body of pasty material to form from the said magnetizable elements an electrically conducting layer embedded in said body of pasty material and extending at least through a portion thereof, causing said body of pasty material containing said layer to set, and connecting electrically conducting terminal members to said electrically conducting layer at spaced-apart positions along the layer.

Aggregate in the form of granular iron ore (magnetite) or other magnetizable granular material having some electrical conductivity may form the layer alone or, preferably, together with magnetizable metal fibres. In the latter case, the conducting granular material will reduce the resistivity of the portions of the initially pasty material separating the fibres.

The stratification of the magnetizable fibrous and/or granular elements by magnetic means in accordance with the method of the invention may be carried out by the method and the device for stratifying and aligning magnetizable metal fibres which are described and claimed in International Application PCT/SE99/01150, published as WO99/67072.

As described in the above-identified international application, the magnetic stratification and alignment of magnetizable fibres dispersed in a viscous or pasty body is carried out by means of a stratifying member having a nonmagnetic wall. A magnetic field is directed into the viscous body through a first portion of the nonmagnetic wall while the fibre-stratifying member is being moved relative to the body of pasty material with the nonmagnetic wall contacting the body and with a second portion of the nonmagnetic portion trailing the first portion. Accordingly, the fibres are temporarily subjected to the magnetic field as the first portion moves past them.

The fibre-stratifying member may be partially or completely immersed in the pasty material as it is moved relative to the body with the first portion of the magnetic wall ahead of the second portion and thus trailed by the latter.

During the relative moment, the fibres in the vicinity of the first portion of the nonmagnetic wall are magnetically attracted towards the first portion. However, they are prevented from coming into contact with the magnetic device by the nonmagnetic wall, which forms a screen or barrier that separates the magnet device from the pasty material in which the fibres are dispersed.

The fibre-stratifying member therefore attracts the fibres and tends to pull them along in the direction of its movement relative to the body of pasty material. Because of its viscosity or pasty character, the material of the body prevents the fibres from moving too rapidly towards the stratifying member and sticking to it. Thus, the fibre-stratifying member will move relative to the fibres and subject them to the magnetic force only temporarily. Since the magnetic force has a component in the direction of relative moment of the fibre-stratifying member and the pasty body, it not only will draw the fibres towards the fibre-stratifying member and thus stratify them to form a densified fibre layer within the body, but also tends to align the fibres in that direction as it moves past them.

Preferably, the pasty material containing the fibres is vibrated adjacent the fibre-stratifying member so that the stratifying and aligning movement of the fibres is facilitated.

The terminal members may be connected to the conducting layer formed by the densified layer of fibres or other magnetizable conducting elements in any suitable manner, before or after the pasty material has set. For example, the concrete or other pasty material may be locally removed to expose the conducting layer in a narrow groove extending across the layer, whereupon a braided strip of copper wire or some other suitable form of "bus bar" conductor adapted for connection to an electric power source, is placed across the layer and secured to it by pouring molten tin over the strip and the exposed layer.

The invention will be more fully understood from the following description with reference to the accompanying drawings showing application of the invention to the production of pavements or other slabs of concrete cast on the ground.

Figure 1:
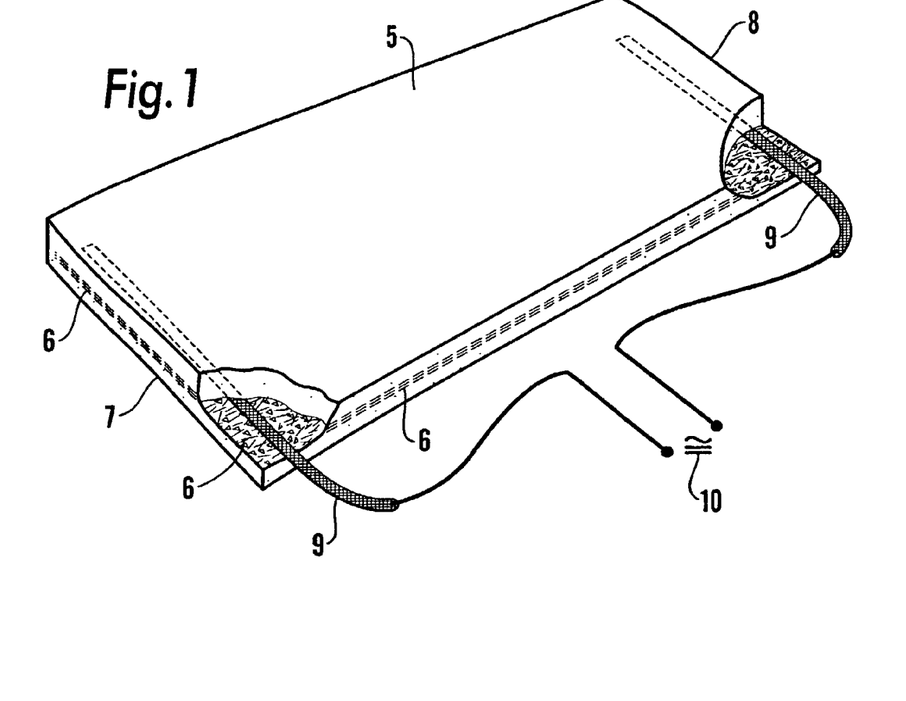
FIG. 1 is a diagrammatic perspective view illustrating the basic principle of the invention as applied to a concrete slab having an electrically conducting path formed from a concentrated layer of magnetizable reinforcing fibres.
Figure 1A:
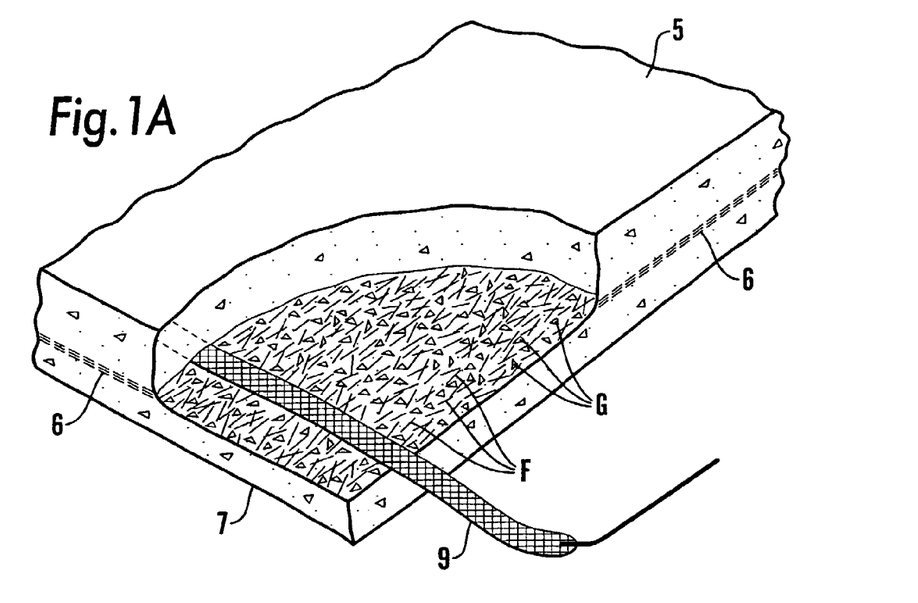
FIG. 1A is an enlarged perspective view of a corner of the slab shown in FIG. 1.

FIGS. 1 and 1A show a rectangular flat concrete body 5, a slab, which is reinforced by means of a multiplicity of magnetizable metal fibres embedded in the concrete and included in a concentrated layer 6 of densely packed fibres F. This layer extends from one end 7 of the concrete body to the other end 8 and is positioned between and parallel to the large faces of the concrete body 5. Two electrically conducting terminal members 9 are embedded in the concrete in contact with fibres of the layer 6 near the ends 7, 8 of the body 5 to pass an electric current provided by a current source 10 into and out of the body through the fibre layer 6. A multiplicity of particulate bodies G of an electrically conducting material, such as iron ore (magnetite), forming part of the aggregate of the concrete may be included in the layer 6 to enhance the electrical conductivity of the layer.

The concrete constituting the main mass of the body 5 may be any conventional concrete including conventional aggregate. Similarly, although steel fibres of the kind commonly used for reinforcing concrete are normally preferred, the fibres may be any magnetizable fibres having the desired electrical conductivity.

Figure 2:
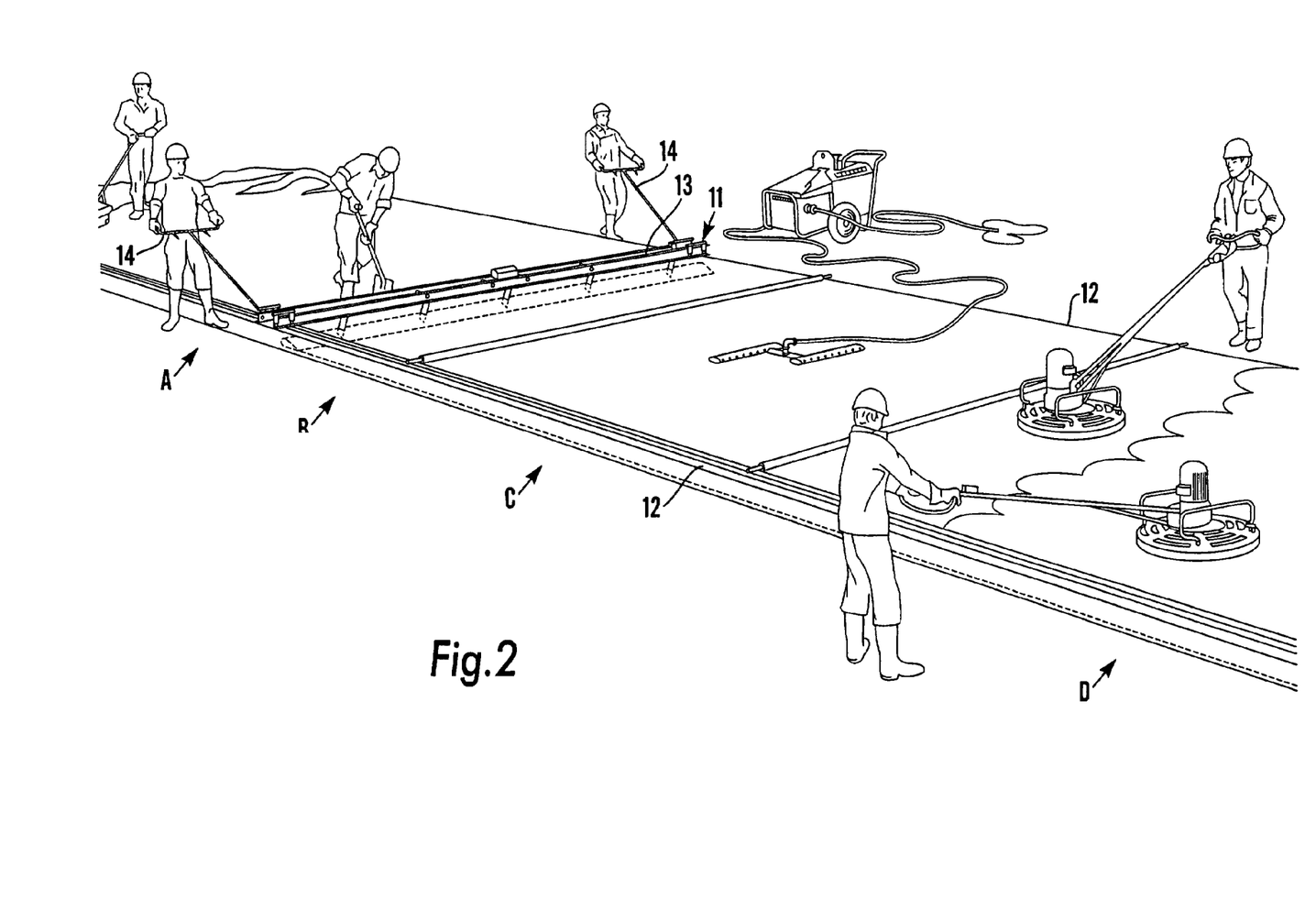
FIG. 2 is an overview illustration showing successive steps in the production of a concrete pavement on the ground, one of the steps being the formation of a concentrated layer of reinforcing steel fibres in accordance with the invention.

As shown by way of example in FIG. 2, the invention is applied to the production of a concrete pavement or slab on the ground. The pavement is shown at different successive steps during its production, the first step being shown to the left and the last step being shown to the right. Furthest to the left, at A, the wet concrete is cast after reinforcement fibres of steel or some other magnetizable material has been added to the concrete and uniformly dispersed in it with random orientation. Then, at B, the wet concrete is vibrated and the reinforcing fibres are aligned lengthways and stratified to form a horizontal layer embedded in the concrete, using a fibre-stratifying device 11 embodying the invention. The fibre-stratifying device 11 is supported by and slidable on rails 12 positioned along the longitudinal edges of the pavement. At C the wet concrete with the stratified and aligned fibres is vacuum treated, and at D the pavement is smoothed.

Figure 3:
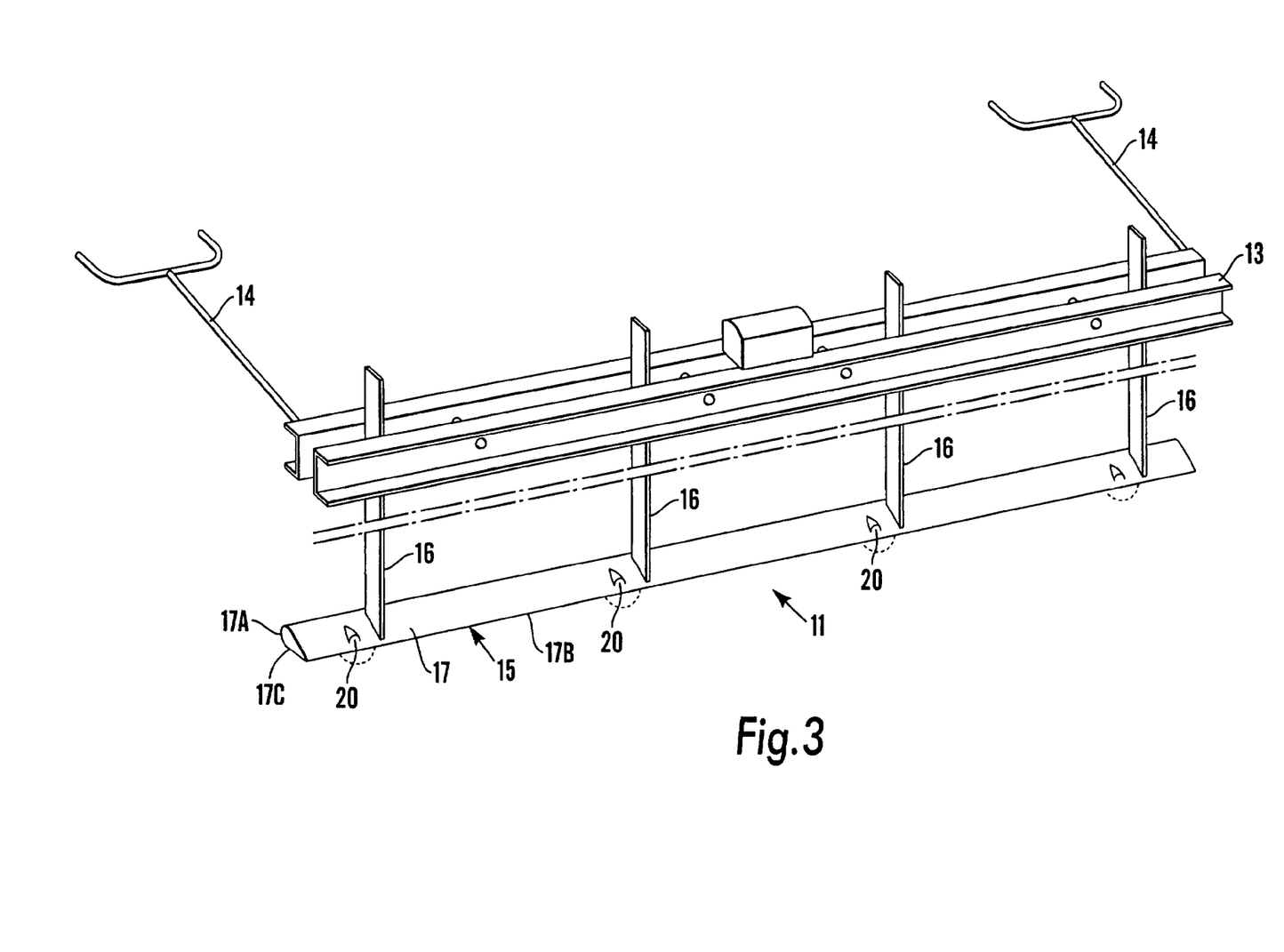
FIG. 3 is a perspective view of a fibre-stratifying device used in the step shown in FIG. 2.

The fibre-stratifying device 11 comprises a horizontal main beam 13 extending across the strip of ground to be paved and resting on the rails 12. It is manually displaced and controlled by means of control rods 14 with handlebars.

A straight horizontal fibre-stratifying member 15 in the shape of a beam or bar is suspended from the main beam 13 by means of hangers 16 which are vertically adjustable to permit positioning of the stratifying member 15 at a selected height. The stratifying member 15 extends across the entire space between the rails 12.

An elongate housing or shell 17 forming part of the stratifying member 15 is drop-shaped in cross-section so that it resembles an airfoil, the rounded first or leading edge of which is directed such that it will be foremost when the stratifying device 11 with the stratifying member 15 is displaced in the proper direction, to the left in FIG. 1, during the stratifying operation. This housing 17 is made of aluminium or some other suitable nonmagnetic material.

Inside the housing 17 of the stratifying member 15, along a foremost or first wall portion 17A of the housing, a rotatably journalled magnet roll 18 extends along the entire length of the stratifying member 15. The first portion 17A of the wall of the housing is arcuate in cross-section and the axis L of the magnet roll 18 coincides with the axis of the first wall portion 17A.

Three permanent magnets 19, made of neodym, for example, are uniformly distributed about the magnet roll 18, each such magnet subtending about ⅙ of the circumference of the magnet roll. The outer surfaces of the magnets 19 are positioned on a circular cylindrical surface concentric with and closely spaced from the first portion 17A of the wall of the housing 17. When the magnet roll 18 is caused to rotate as described below, the permanent magnets 19 accordingly will move close to the inner side of the first wall portion 17A.

Figure 4:
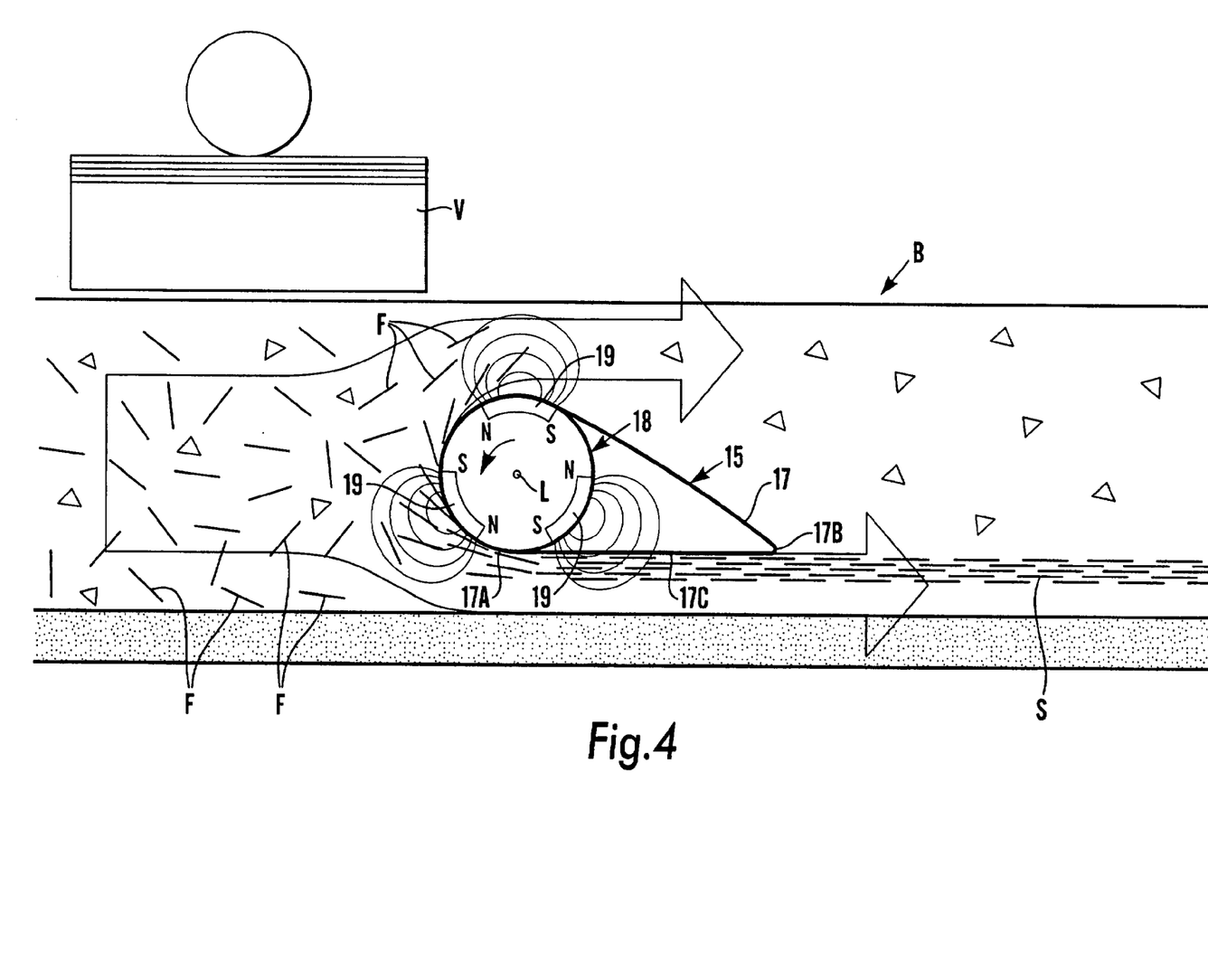
FIG. 4 is a cross-sectional view of the section of the concrete pavement of FIG. 2 in which the fibre stratification is being carried out.

As indicated by the north and south pole designations N and S and the magnetic field lines in FIG. 4, the magnets 19 are mounted on the magnet roll 18 such that the field lines run in planes which are perpendicular to the axis L of the magnet roll 18. In the illustrated embodiment the magnet roll 18 is rotated counter-clockwise, viewed as in FIG. 4, by a number of electric motors 20 spaced apart along the length of the stratifying member 15. If desired or required, the direction of rotation of the magnet roll 18 can be reversible.

To permit adjustment of the stratifying member 15 to a desired angle of attack, so that the trailing or second portion 17B of the wall of the housing 17 will be at a selected height, the stratifying member 15 is mounted for pivotal movement about an axis which is parallel to, e.g. coinciding with, the axis L of the roll 18. Locking means, not shown, are provided to lock the stratifying member 15 in a selected angular position.

During the fibre stratification and aligning operation the fibre-stratifying device 11 rests on the rails 12 with the stratifying member 15 set at a height such that the lowermost segment of the first portion 17A of the wall of the housing 17 is relatively close to the underside of the cast layer of wet pasty concrete. Moreover, the stratifying member 15 is adjusted angularly such that the second portion 17B of the wall of the housing 17 is at approximately the same height as the lowermost segment of the first wall portion 17A.

After the stratifying member 15 has been adjusted to the desired height and the desired angular position, the stratifying device 11 is slowly displaced to the left as viewed in FIGS. 2–4 so that the first portion 17A of the wall of the housing 17 is ahead of and trailed by the second wall portion 17B. The magnet roll 18 rotates continuously in the direction indicated by an arrow (counter-clockwise), and a vibrator V supported by the stratifying device 11 operates to vibrate the concrete in the region of the body of concrete in which the stratifying member 15 operates.

As indicated by the outline arrows in FIG. 4, a portion of the concrete is displaced upwards and passes across the upper side of the stratifying member 15 while another portion is displaced downwards and passes across the underside. During their movement along the inner side of the leading first wall portion 17A, the permanent magnets 19 provided on the magnet roll 18 will direct their magnetic fields into the concrete in front of, above and below the first wall portion 17A.

The magnetic fields, the field lines of which generally run in planes which are perpendicular to the axis L of rotation of the magnet roll 18, orbit counter-clockwise together with the roll. During their orbiting movement they apply to the reinforcement fibres F subtended by the magnetic fields a magnetic attraction force that tends to attract the fibres towards the leading first wall portion 17A of the housing 17 and to align the fibres along the field line planes. At the same time, fibres positioned above the level of the underside of the stratifying member 15 are drawn downwards by the magnetic attraction and the downward diversion of concrete, and fibres below that level are drawn upwards.

Accordingly, the fibres F, or at least a large proportion of them, tend to move towards the underside of the stratifying member 15 and stratify there to form a horizontal layer S of densely arranged fibres, a large proportion of which are aligned predominantly in the relative direction of movement of the stratifying member 15 and the concrete body. A considerable number of fibres F in or close to the layer may also be orientated at an angle to the relative direction of movement to form conducting bridges between laterally separated fibres.

When a fibre F reaches a position abreast of the intermediate flat wall portion 17C of the underside of the housing 17, the strength of the magnetic field, and thus the magnetic attraction on the fibre, decreases sharply because the magnet 19 which is closest to the transition between the first wall portion 17A and the intermediate wall portion 17C moves upwardly away from the fibre. Accordingly, the magnetic attraction on the fibre F will no longer be strong enough to pull the fibre along with the stratifying member 15, so that the fibre will be left behind in the aligned position in the fibre layer T.

When a fibre F reaches a position abreast of the intermediate flat wall portion 17C of the underside of the housing 17, the strength of the magnetic field, and thus the magnetic attraction on the fibre, decreases sharply because the magnet 19 which is closest to the transition between the first wall portion 17A and the intermediate wall portion 17C moves upwardly away from the fibre. Accordingly, the magnetic attraction on the fibre F will no longer be strong enough to pull the fibre along with the stratifying member 15, so that the fibre will be left behind in the aligned position in the fibre layer S.

Figure 5:
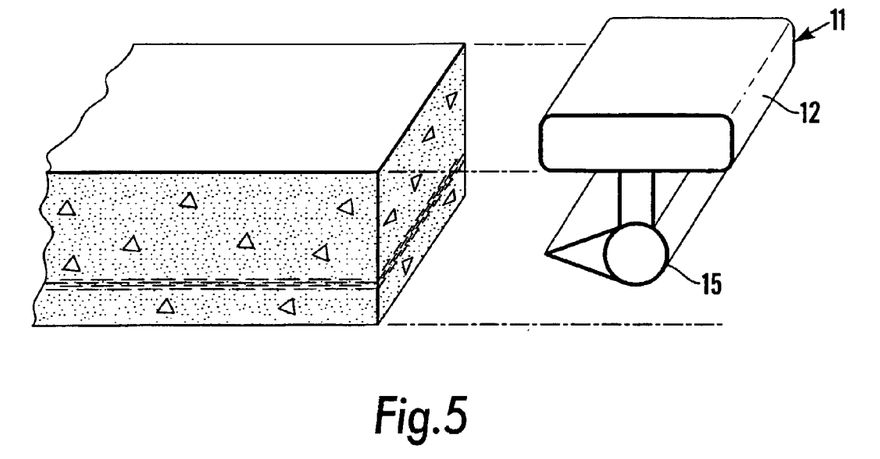
FIGS. 5–7 are diagrammatic views of three slabs of different heights cast on the ground and shown together with fibre-stratifying devices.
Figure 6:
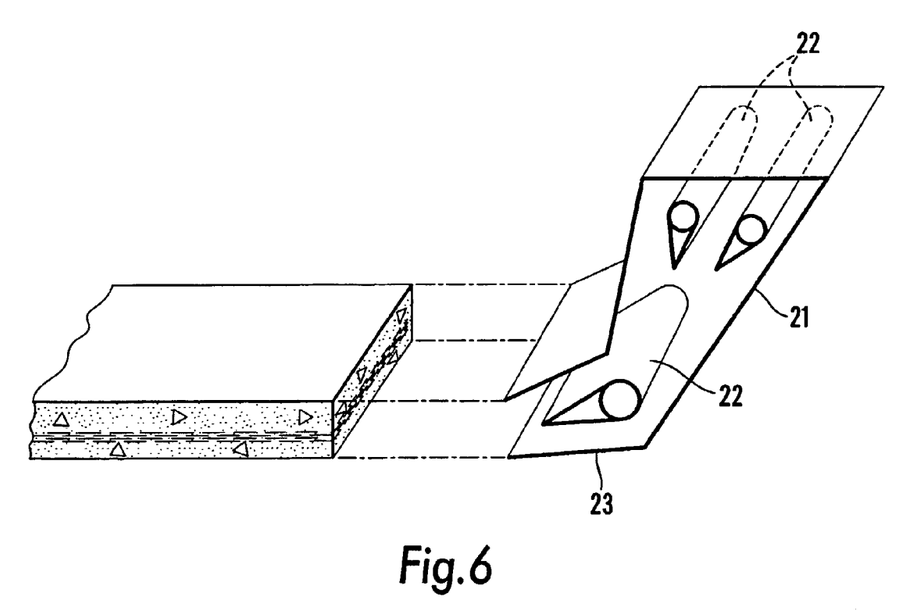
Figure 7:
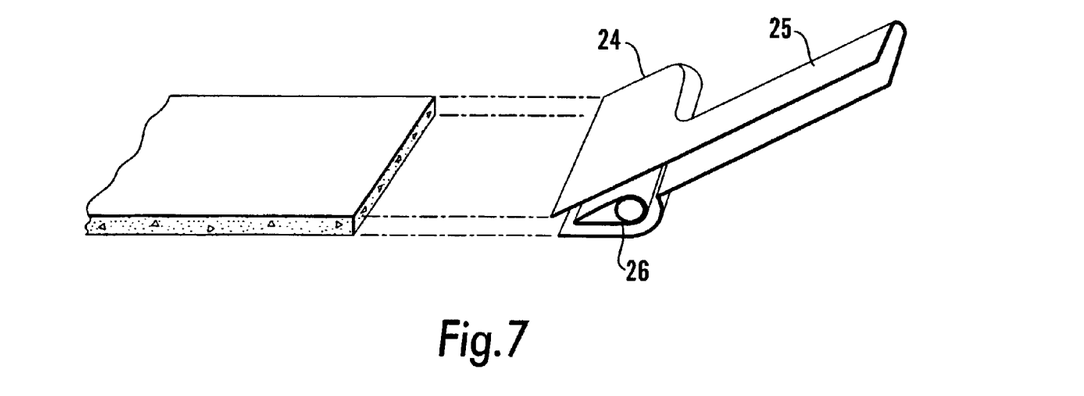

FIGS. 5, 6 and 7 diagrammatically show three different ways of carrying out the invention. The technique represented by FIG. 5 essentially corresponds to the technique shown in FIGS. 2–4 and described above. Accordingly, the stratification and alignment of the fibres takes place after the wet concrete containing the fibres has been placed on the ground.

FIGS. 6 and 7 show embodiments in which the stratification and alignment of the fibres takes place during the placement of the concrete layer on the ground. More particularly, FIG. 6 shows a device for placing the concrete and stratifying and aligning the fibres which device is intended to be carried by a laying vehicle moving along the surface on which the reinforced concrete body is to be placed. In this device the stratification and alignment of the fibres takes place in two steps. The wet concrete with admixed reinforcing fibres is fed into a steeply inclined bin 21 in which two stratifying members 22 similar to the stratifying member 15 of FIGS. 2 to 4 are positioned side by side. An additional stratifying member 22 similar to the stratifying member 15 is positioned in a laying nozzle 23. This nozzle forms a downward continuation of the bin 21 and has a spout with a straight discharge opening through which a layer of concrete of the desired thickness is discharged and placed on the ground.

Figure 8:
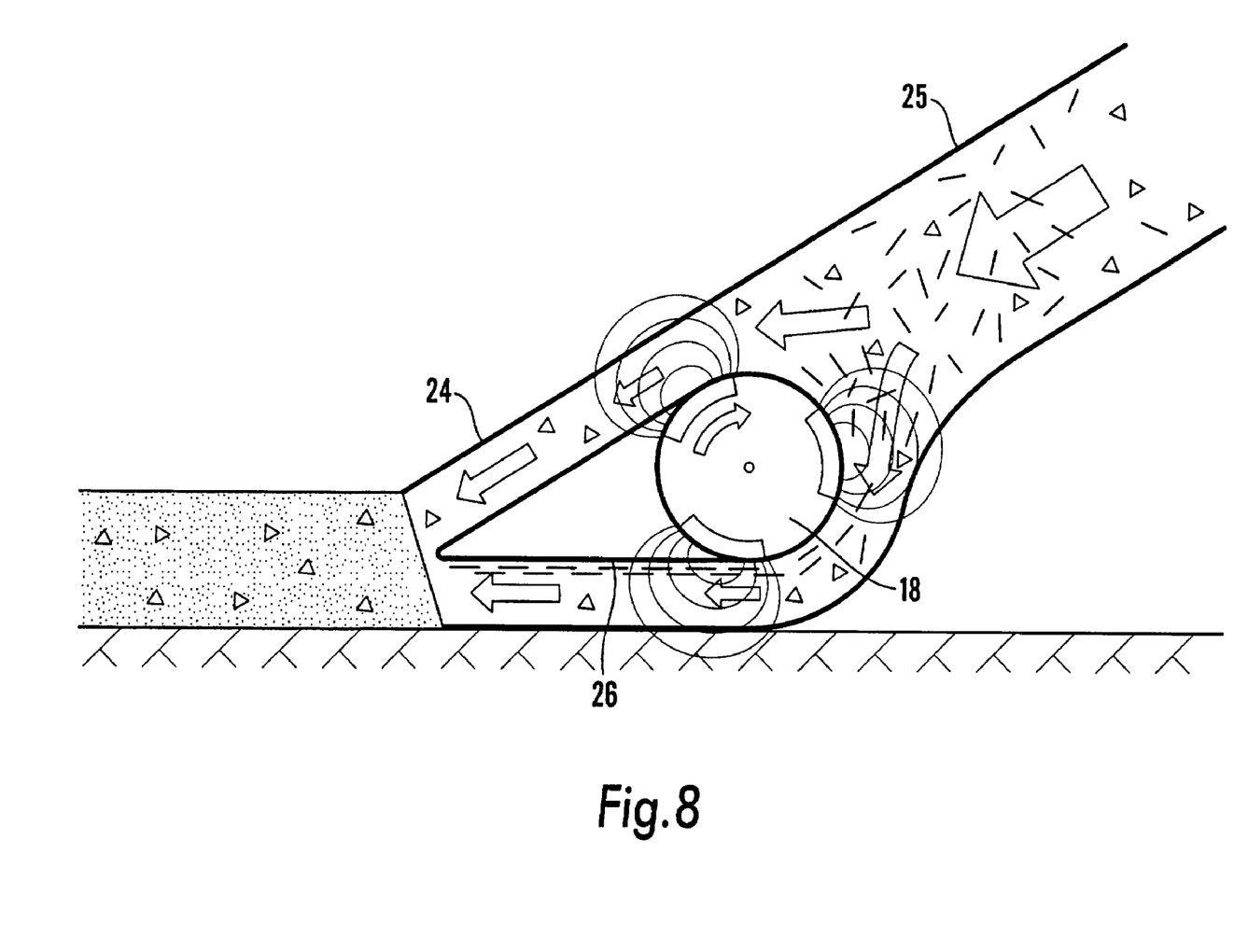
FIG. 8 is a cross-sectional view showing a modification of the device of FIG. 7.

The device shown in FIG. 7 is primarily intended to be used for laying of relatively thin and narrow layers and is manipulated manually. It includes a laying nozzle 24 resembling the laying nozzle 23 in FIG. 6 and a tubular shaft 25 into which wet concrete with admixed fibres is fed from a concrete pump (not shown) through a hose. Within the laying nozzle 24 a stratifying member 26 similar to the stratifying member 15 of FIGS. 2 to 4 is disposed. FIG. 8 shows the device in FIG. 7 in greater detail.

Figure 9:
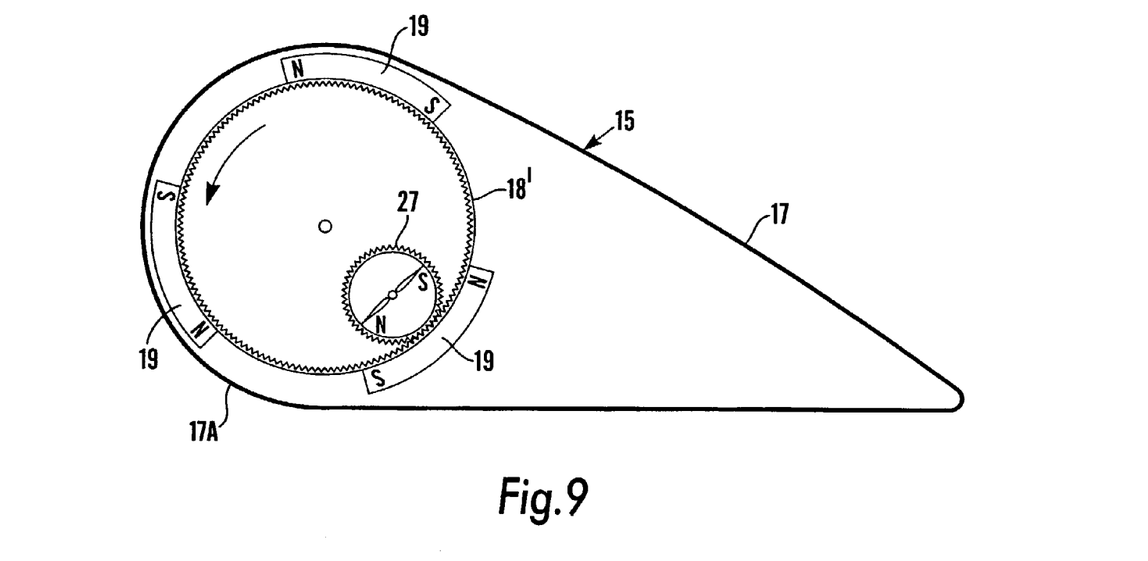
FIG. 9 is a cross-sectional view showing a modification of the fibre-stratifying device of FIG. 4.

FIG. 9 shows a modification of the stratifying member 15 of FIGS. 2 to 4. In this case there is provided inside the rotatable magnet roll 18' a stationary second magnet roll 27 which is positioned in the rear region of the first or leading portion 17A of the wall of the housing 17. It is arranged in operation to rotate at a speed which has a certain numerical relationship, 3:1, to the speed at which the magnet roll 18' rotates. One half of the magnet roll 27 is magnetized as indicated by the pole designations N and S while the other half is substantially unmagnetized. Whenever one of the permanent magnets 19 of the rotating magnet roll 18 enters the region in which the magnet roll 27 is positioned, the magnetic field of that magnet 19 will close its field lines through the magnet roll 27 so that only a small portion of the magnetic field is directed into the concrete body. Consequently, the attraction the magnet roll 18' exerts on the reinforcing fibres in the concrete body, and thus the tendency of the stratifying member 15 to pull the fibres along, is very sharply reduced when the fibres are in the region beneath the magnet roll 27.

Several modifications of the presently preferred stratifying method and device shown in the drawings are possible within the scope of the invention as defined in the claims.

For example, the cross-section of the housing 17 of the stratifying member 15 may be substantially symmetrical with respect to a plane that passes through the axis L of the magnet roll 18 and is substantially perpendicular to another plane that passes through the axis L and the edge of the second portion 17B of the wall of the housing 17. With this symmetrical cross-section, the stratifying member accordingly has a thin edge portion on opposite sides of the thickest section of the housing 17 where the magnet roll 18 is positioned so that it can be moved in opposite directions in the concrete, e.g. across the width of a wide pavement strip, without encountering a great resistance to the movement.

In this modification, it may be preferable to have two magnet rolls 18, which are associated with opposite sides of the housing 17 and rotate in opposite directions. Alternatively, a single magnet roll 18 may be provided which has only a single magnet on the circumference and is rotated alternately in opposite directions through an angle of more than 180 degrees and preferably approximately 270 degrees. The magnetic field will then be directed alternately into the concrete above the stratifying member and into the concrete below the stratifying member. This mode of intermittent, reversed rotation ensures that the fibres are temporarily subjected to a magnetic pulling force in the direction in which the stratifying member 15 moves relative to the concrete.

Although in the embodiment of the invention described and illustrated in the drawings a large majority of the stratified fibres are aligned horizontally generally in the direction of relative movement of the stratifying member and the concrete, it is possible to align the fibres in a horizontal direction generally perpendicular to the direction of relative movement if the magnets 19 on the magnet roll 18 are magnetized such that their magnetic field lines run predominantly in planes extending along the length of the stratifying member 15. By suitably matching the speed of relative movement to the strength of the magnets and the viscosity of the wet concrete, it is also possible to have an incomplete alignment of the fibres in the direction of the relative movement so that a fairly large number of fibres extend at a smaller or larger angle to the direction of movement. Thereby a reinforcement in the transverse direction is obtained and at the same time the number of contact points between the fibres is increased.

It is also to be noted that the magnets or other means producing the magnetic fields, or all such magnets or other means, need not necessarily be movable relative to the stratifying member. Fixed permanent magnets or other devices producing magnetic fields may be incorporated in the stratifying member to direct constant or intermittent magnetic fields into the material containing the magnetizable fibres to stratify and align them.

What is claimed is:

1. A solid body formed of a set, initially pasty cementitious material and including an electrically conducting path formed by a concentrated layer of electrically conducting magnetizable fibrous and/or granular elements, said layer being embedded in said material and extending through generally parallel to a face of said body.

2. A body according to claim 1 in which electrically conducting terminal members are connected to said electrically conducting layer at spaced-apart positions along the layer.

3. A body according to claim 1 in the shape of a slab, said concentrated layer of electrically conducting magnetizable elements extending generally along a face of the slab.

4. A body according to claim 1 in which the said concentrated layer of electrically conducting magnetizable elements includes granular iron ore.

5. A body according to claim 2 in which the major portion of each of the electrically conducting terminal members is embedded in the body.

6. A body according to claim 1 in which the electrically conducting magnetizable elements include fibres which are aligned in said body to extend generally in the direction of a line extending between spaced-apart positions along the layer.

7. A body according to claim 1 in which steel fibres are included in said layer.

8. A method of providing an electrically conducting path in a body of a set, initially pasty cementitious material, including the steps of
    forming a body of the pasty material in which electrically conducting magnetizable fibrous and/or granular elements are dispersed,
    applying a magnetic field to the body of pasty material to form from the said magnetizable elements an electrically conducting layer embedded in said body of pasty material and extending extending generally parallel to a face of said body of pasty material, and
    causing said body of pasty material containing said layer to set.

9. A method according to claim 8, further including the step of connecting electrically conducting terminal members to said electrically conducting layer at spaced-apart positions along the layer.

10. A method according to claim 8 in which the pasty material includes granular iron ore bodies initially distributed substantially uniformly in the pasty material.

11. A method according to claim 8 in which the body of pasty material is a slab.

12. A method according to claim 8 in which the electrically conducting layer is formed by movement of a stratifying member including magnet means for producing said magnetic field, said movement being substantially parallel to a face of the body of pasty material.

13. A method according to claim 12 in which the stratifying member is at least partially immersed in the body of pasty material during said movement.

14. A method according to claim 12 in which the body of pasty material is vibrated during said movement of the stratifying member.

15. A method according to claim 12 in which the magnetic field is applied to the body of pasty material predominantly through a non-magnetic wall of the stratifying member.

16. A method according to claim 15 in which the magnetic field is applied to the body of pasty material substantially exclusively through said nonmagnetic wall.

17. A method according to claim 12 in which the field lines if the magnetic field applied to the body of pasty material run predominantly in planes which are substantially transverse to said face of the body and substantially parallel to the direction of said movement of the stratifying member.

18. A method according to claim 15 in which the magnetic field is directed into the body of pasty material by means of a magnet means which is enclosed in the stratifying member and caused during said movement of the stratifying member to move angularly about an axis extending generally parallel to said face of the body of pasty material and transverse to the direction of said movement of the stratifying member.

19. The solid body of claim 1, wherein the electrically conducting path is in a plane parallel to a longitudinal plane of said body.

20. The method of claim 8 wherein the electrically conducting layer is in a plane parallel to a longitudinal plane of said body.

* * * * *

UNITED STATES PATENT AND TRADEMARK OFFICE
CERTIFICATE OF CORRECTION

PATENT NO. : 6,972,156 B2
DATED : December 6, 2005
INVENTOR(S) : Svedberg

Page 1 of 1

It is certified that error appears in the above-identified patent and that said Letters Patent is hereby corrected as shown below:

<u>Column 7,</u>
Lines 44-49, should read as follows:

1. A solid body formed of a set, initially pasty cementitious material and including an electrically conducting path formed by a concentrated layer of electrically conducting magnetizable fibrous and/or granular elements, said layer being embedded in said material and extending generally parallel to a face of said body.

Signed and Sealed this

Thirtieth Day of May, 2006

JON W. DUDAS
*Director of the United States Patent and Trademark Office*